United States Patent [19]

Denisart et al.

[11] Patent Number: 5,447,190
[45] Date of Patent: Sep. 5, 1995

[54] DEVICE AND METHOD FOR COOLING AN EXTRUSION CYLINDER

[75] Inventors: Jean-Paul Denisart, La Conversion; Eric Thevoz, Epalinges; Eric Affolter, Morges, all of Switzerland

[73] Assignee: Nokia-Maillefer SA, Ecublens/VD, Switzerland

[21] Appl. No.: 183,946

[22] Filed: Jan. 21, 1994

[30] Foreign Application Priority Data

Feb. 4, 1993 [CH] Switzerland ............... 00340/93

[51] Int. Cl.⁶ .............. F25B 29/00; B29C 47/88; B29C 47/82
[52] U.S. Cl. ........................... 165/2; 165/30; 165/64; 165/183; 425/144; 425/378.1; 425/379.1; 219/201; 219/531; 219/535; 219/539; 219/544
[58] Field of Search ............ 165/30, 64, 183, 2; 425/143, 144, 378.1, 379.1; 219/201, 531, 535, 539, 544

[56] References Cited

U.S. PATENT DOCUMENTS

| | | | |
|---|---|---|---|
| 2,541,201 | 2/1951 | Buecken et al. | 425/379.1 |
| 2,653,800 | 9/1953 | Anton | 165/183 |
| 2,769,201 | 11/1956 | Lorenian | 425/144 |
| 2,893,055 | 7/1959 | Wenzel | 165/64 |
| 3,167,812 | 2/1965 | Von Benningsen | 165/30 |
| 3,218,671 | 11/1965 | Justus et al. | 425/144 |
| 3,219,786 | 11/1965 | Wenzel | 425/378.1 |
| 3,353,212 | 11/1967 | Nelson et al. | 425/379.1 |
| 3,743,252 | 7/1973 | Schott, Jr. | 425/378.1 |
| 4,072,185 | 2/1978 | Nelson | 425/144 |
| 4,758,146 | 7/1988 | Piazzola | 425/144 |
| 4,763,722 | 8/1988 | Piazzola | 165/64 |

FOREIGN PATENT DOCUMENTS

| | | | |
|---|---|---|---|
| 2801499 | 7/1979 | Germany | 425/379.1 |
| 4103221 | 8/1991 | Germany | 425/378.1 |
| 0502181 | 3/1971 | Switzerland | 425/378.1 |
| 113331 | of 1917 | United Kingdom | 165/184 |
| 0828083 | 2/1960 | United Kingdom | 425/378.1 |
| 0420475 | 3/1974 | U.S.S.R. | 425/379.1 |
| WO/8702617 | 5/1987 | WIPO | 425/378.1 |

*Primary Examiner*—John K. Ford
*Attorney, Agent, or Firm*—Oliff & Berridge

[57] ABSTRACT

A longitudinal stream of cooling air is caused to flow around the cylinder (10) and over the length of each of one or more heating-and-cooling zones. This longitudinal flow is facilitated by specially designed cooling fins (22; 25). The performance of the extruder is improved in that the temperature over the cross-section of the cylinder is more uniform. Moreover, wear and tear on the extrusion screw and on the cylinder are greatly reduced.

13 Claims, 4 Drawing Sheets

DEVICE AND METHOD FOR COOLING AN EXTRUSION CYLINDER

BACKGROUND OF THE INVENTION

1. Field of the Invention

This invention relates to extrusion equipment, and more particularly to a method of air-cooling an extruder cylinder, the length of which includes at least one heating-and-cooling zone, as well as to a device for implementing this method.

2. Description of Related Art

In order for plastics, usually in the form of pellets or granules and coming from a hopper, to be worked in an extruder, they are fed in at one end of an extrusion cylinder and are then led all along the cylinder by means of an extrusion screw to emerge in a pasty form through a die mounted at the other end of the cylinder. The plastic material therefore passes from a solid state to a pasty state over a given distance, this transformation of material involving substantial exchanges of heat. In order for transformation of the material to be complete, it must attain a given temperature before passing through the die; for that purpose, the temperature of the cylinder surrounding the screw must be precisely controlled, this temperature depending essentially on the type of plastic being extruded and the type of screw being used. In order to maintain the cylinder at this given temperature, heating elements and cooling devices are disposed along the cylinder. In general, the latter is divided into several successive independent heating-and-cooling zones, whereby a temperature profile along the cylinder is obtained. Before the machine is started up, the cylinder must be heated by means of the heating elements in order to bring it up to its set temperature, whereas thereafter, the kneading and mechanical constriction imposed on the plastic by the screw supply the system with an amount of heat which may be sufficient or even in excess of what is needed to keep the system at the set temperature. It may therefore be necessary to add a cooling system to the cylinder so that, by combining the heating and cooling cycles, the cylinder, and hence the plastic, remains at an approximately even temperature over a given zone of the cylinder.

Various cooling methods and systems have already been proposed, e.g., those using a cooling liquid such as water or oil. The main drawback of these systems resides in the complexity of the cooling circuit, as well as the particular machining of the extrusion cylinder in order to have the cooling ducts pass through it.

Other systems proposed use a stream of air as the coolant. The advantage as compared with the liquid cooling systems is the simplicity of the circuit and of the cylinder. Such a prior art system for cooling by air circulation is illustrated in FIG. 1, which is a cross-section through the cylinder 10 of an extruder 1. Cylinder 10 comprises a cylindrical interior space in which the screw (not shown) rotates. The cooling circuit 2 is composed, firstly, of a cool-air supply, here represented by a blower 20 causing air, generally drawn from the ambient atmosphere or from a cool-air source, to circulate within an enclosure 21 which completely surrounds the relevant heating-and-cooling zone of cylinder 10 over its entire length. Several systems such as the one shown here are usually installed, one after another all along cylinder 10, each of them constituting a heating-and-cooling zone. Heat-exchange means 22 surround cylinder 10, with various designs such as copper tongues 22A, disks 22B, or wedges 22C being shown in the drawing. Heat-exchange means 22 are associated with the heating circuit 3, heating sleeves 30 of which are merely indicated diagrammatically. As may be seen in this drawing, the circulation of cooling air takes place with a rising movement, coming from blower 20, circulating on both sides of cylinder 10 while passing through heat-exchange means 22, and escaping through a grid 23 or openings made at the top of enclosure 21, as indicated by arrows.

Owing to the rising movement of the cooling air, due particularly to the chimney effect, cylinder 10 is not cooled homogeneously; for the air in contact with the lower part of cylinder 10, designated as region 11, is still cool, whereas it warms up while passing over the sides of cylinder 10 to attain its maximum temperature toward the top of cylinder 10, i.e., the region designated 12. Inasmuch as the air is warmest at the top of cylinder 10, region 12 is less efficiently cooled than region 11; this leads to deformation of cylinder 10 since the elongation of the top part 12 of cylinder 10 is greater than that of the bottom part 11. In view of the longitudinal curvature taken on by cylinder 10, it is no longer exactly coaxial with the screw; the slight clearance existing between the screw and the inside surface of the cylinder is undesirably modified, which leads to premature wear and tear on the screw and on the cylinder, as well as to irregular working of the plastic being kneaded.

Another cooling device is disclosed in U.S. Pat. No. 4,763,722. As in the device described above, the air circulates in a direction perpendicular to the axis of the extrusion cylinder; and although in this case the air is returned for a second passage in the opposite direction, the movement of air always remains perpendicular to the axis of the cylinder, bringing about unequal cooling of the top and bottom parts of the cylinder.

SUMMARY OF THE INVENTION

It is therefore an object of this invention to provide an improved method of cooling the cylinder of an extruder which avoids the drawbacks mentioned above, i.e., which allows uniform cooling of the cylinder over its entire cross-section.

Another object of this invention is to provide an improved device for cooling the cylinder of an extruder which is suitable for carrying out the aforementioned method.

A further object is to provide such a device which can easily be installed on an existing extruder or can be mounted on a new machine from the outset.

To this end, in the cooling method according to the present invention, for each heating-and-cooling zone, air-delivery means inject cool air at at least one point of entry within an enclosure surrounding the heating-and-cooling zone, the air then being directed in order to be distributed over the periphery of the cylinder and to flow substantially longitudinally along the zone, then to be exhausted at at least one point of exit from the enclosure.

In the device according to the invention, the improvement comprises at least one air-delivery means connected to at least one point of entry of an enclosure surrounding the cylinder, means for guiding the stream of air within the enclosure, disposed so as to distribute the stream of air around the cylinder, then to cause it to flow substantially longitudinally along the heating-andcooling zone, heat-exchange means disposed on the periphery of the cylinder, and at least one point of exit of air.

BRIEF DESCRIPTION OF THE DRAWINGS

Preferred embodiments of the invention will now be described in detail with reference to the accompanying drawings, in which.

DETAILED DESCRIPTION OF PREFERRED EMBODIMENTS

Figure 1:
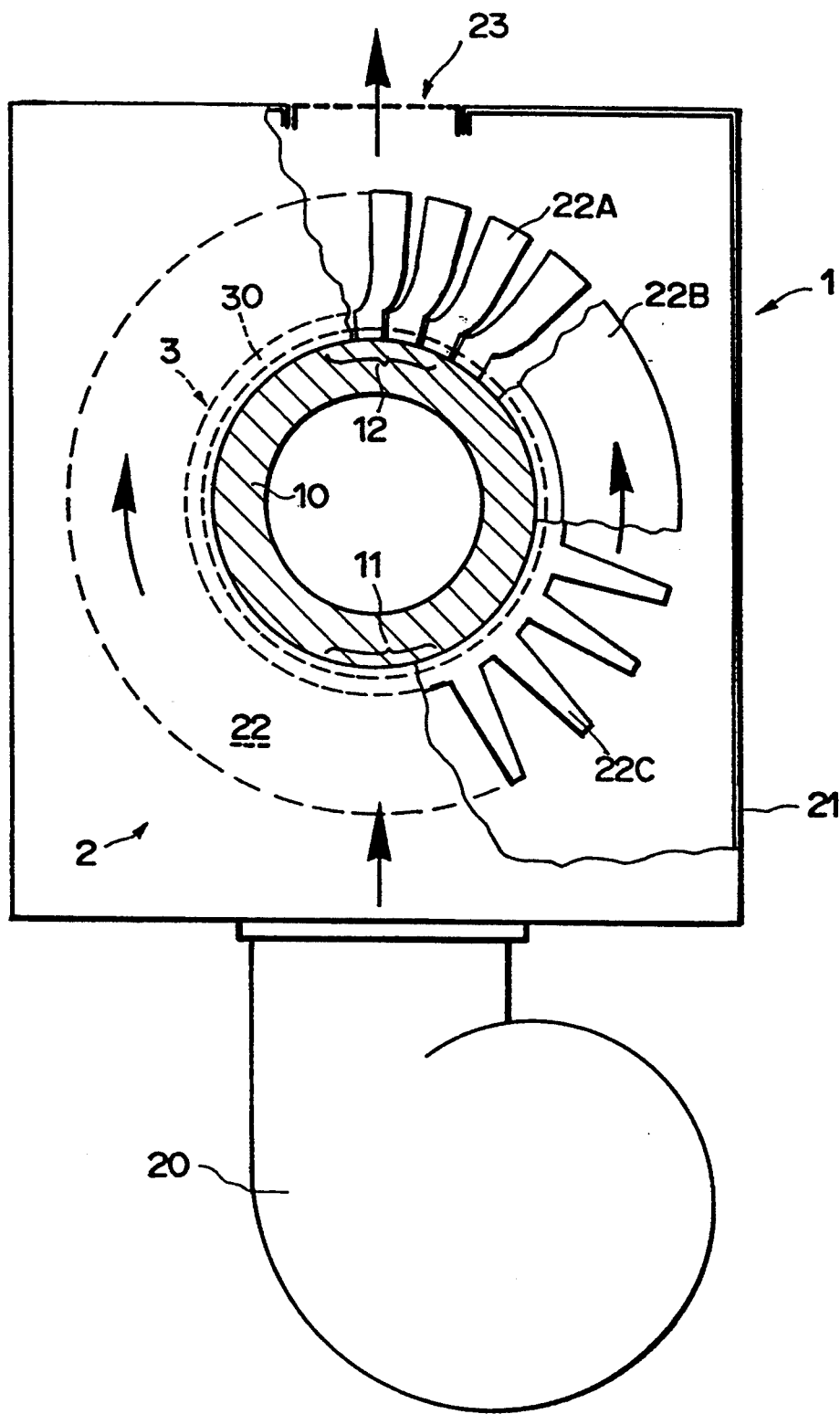
FIG. 1 is a cross-section through an extrusion cylinder equipped with a prior art cooling device.
Figure 2:
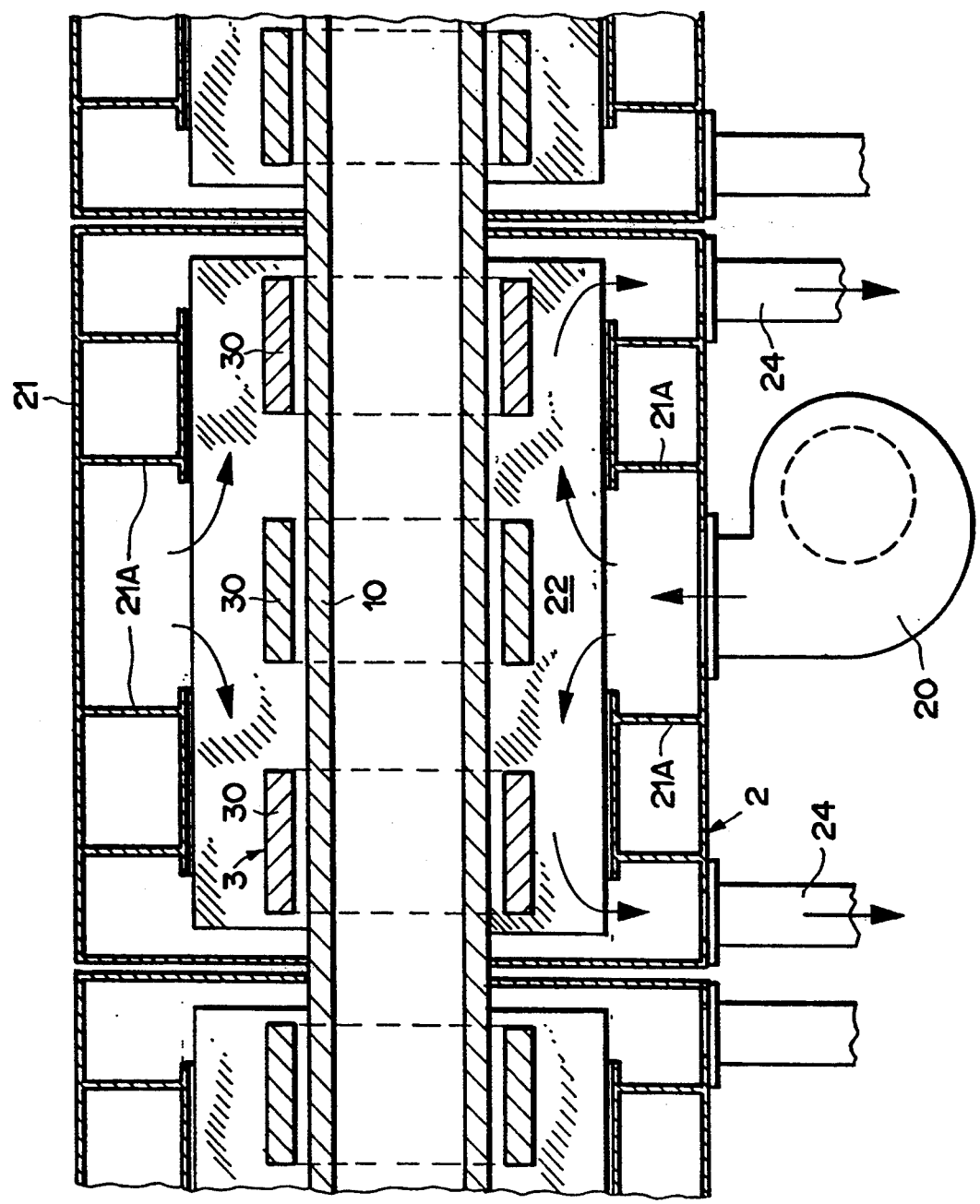
FIG. 2 is a longitudinal section through part of an extrusion cylinder having a heating-and-cooling zone, equipped with a cooling device in a first embodiment of the invention.

FIG. 2, a longitudinal section of part of a cylinder 10 of an extruder, shows one heating-and-cooling zone and portions of two adjacent ones. The extrusion screw disposed within cylinder 10 is omitted in order not to clutter the drawing. A cooling circuit 2 of this heating-and-cooling zone also comprises a blower 20 which feeds air to the outside surface of cylinder 10, jacketed in an enclosure 21. According to the present invention, and contrary to the prior art system illustrated in FIG. 1, the air circuit here is so arranged that after the air has been distributed over the periphery of cylinder 10, it flows substantially longitudinally along the cylinder portion. For this purpose, baffles 21A guide the stream of air coming from blower 20 in order to distribute it and to cause it to flow longitudinally into the heat-exchange or cooling means 22, shown diagrammatically in FIG. 2. These means 22 may be of the same type as previously described with reference to FIG. 1, or they may be specially designed for longitudinal air circulation as will be explained below.

Figure 3:
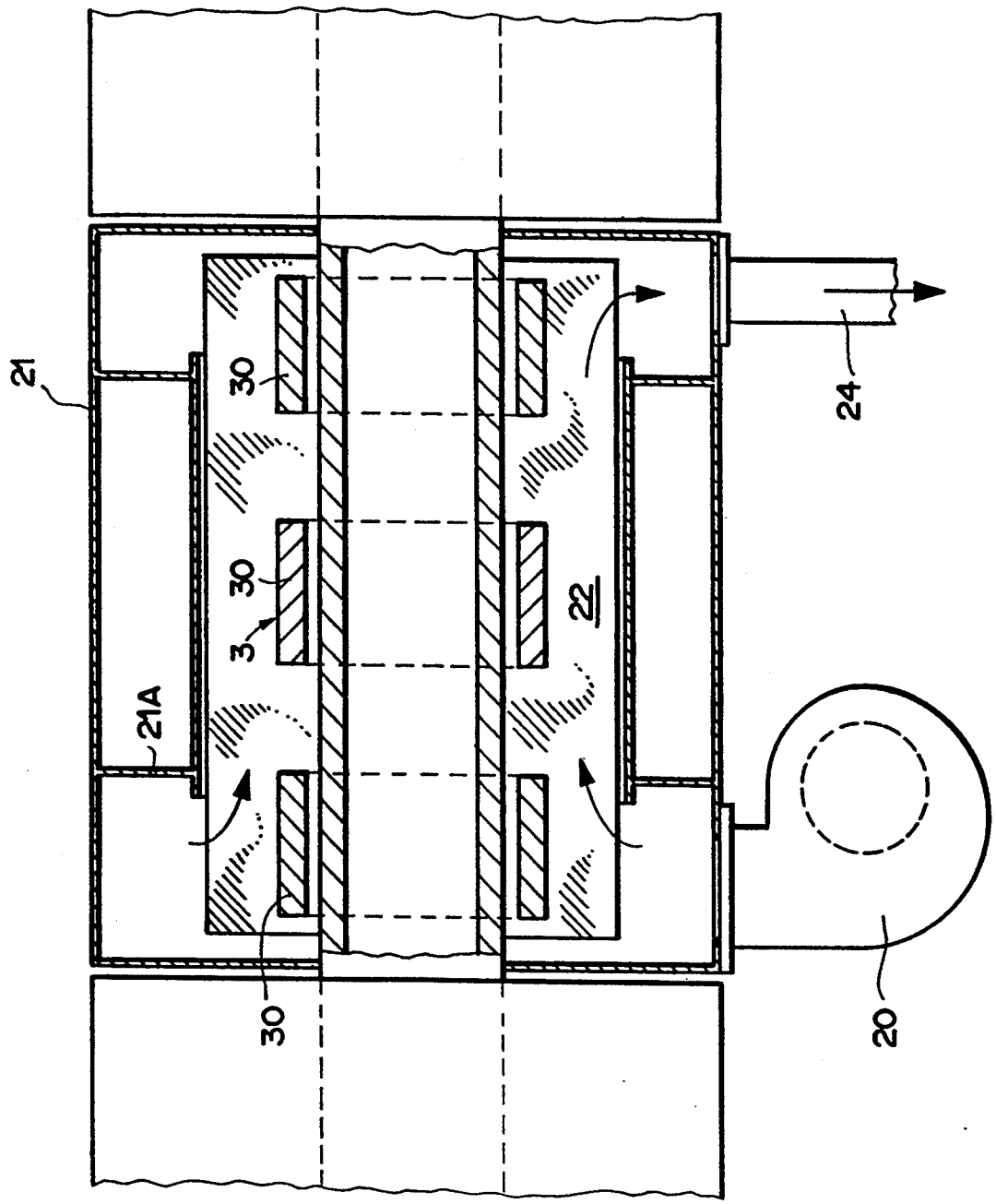
FIG. 3 is a section similar to that of FIG. 2, with a cooling device in another embodiment of the invention.

As in the prior art design, the device includes a heating circuit 3, which may be composed of sleeves 30. In order to avoid the chimney effect, the hot air is exhausted from enclosure 21 through one or more openings 24 preferably disposed toward the bottom of the enclosure. Thus, the air flowing longitudinally along the heating-and-cooling zone causes uniform cooling of the cross-section of cylinder 10, the top part of this cylinder being cooled in the same way as the bottom part. In the embodiment illustrated in FIG. 2, the cool air coming from blower 20 is supplied at an approximately central location of the heating-and-cooling zone and is exhausted at the ends, whereas in the embodiment of FIG. 3, the cool air is supplied at one end of the zone and exhausted at the other.

The means for supplying the cool air are shown here in the form of a blower 20 associated solely with the particular heating-and-cooling zone. It will be understood, however, that one blower may feed several heating-and-cooling zones, just as the air-supply means may take the form of a cool-air line feeding a number of machines, a whole factory, or part of a factory.

As stated above, the cooling means 22 shown in FIG. 1, viz., tongues 22A, wedges 22C, or others not yet shown—except for disks 22B which are too specifically provided for a prior art cooling method—may be used with this novel longitudinal cooling method according to the present invention, even though their operation may not be optimal.

Figure 4:
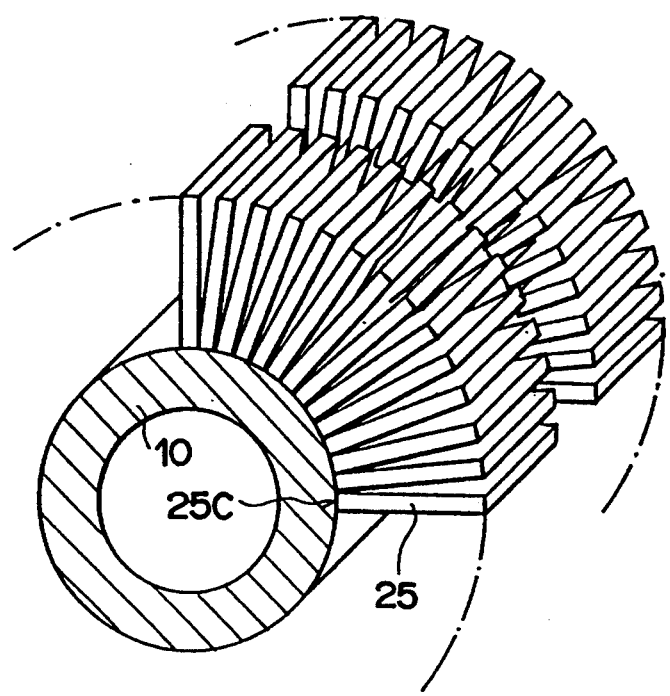
FIG. 4 is a perspective view of part of a heating-and-cooling zone provided with cooling fins according to the present invention.
Figure 5A:
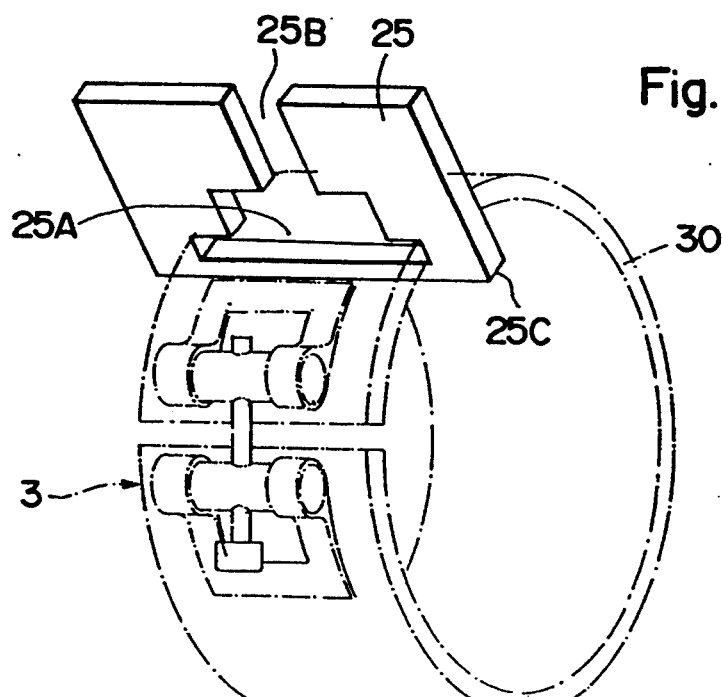
FIG. 5A is a perspective view of a cooling fin mounted on a heating collar.
Figure 5B:
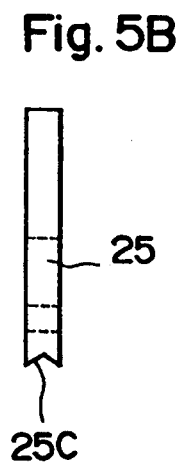
FIG. 5B is an end-on view of the aforementioned fin.

In order to increase the cooling efficiency of the system, cooling fins 25 may be disposed around cylinder 10 as depicted in FIG. 4. This drawing figure shows fins 25 on only part of the periphery of cylinder 10, but it will be understood that, in practice, fins are disposed over the entire periphery of the cylinder. Cooling fins 25 are preferably made up as indicated in FIGS. 5A and 5B. Each fin 25 has the general shape of a relatively thin rectangular parallelepiped, on the order of a few millimeters thick, some 40–50 mm high, and about twice as long, these dimensions and proportions being of a purely indicative nature. Fins 25 are made of a material which is a good heat conductor, such as copper or aluminum.

As may be seen in FIG. 5A, fin 25 includes an aperture 25A and a wide center slot 25B, both intended to receive and fix a conventional heating sleeve or collar. The underside 25C of fin 25, which is to be in contact with the outside surface of cylinder 10 and hence to provide the heat exchange with the latter, may be either plane or cut in a concave manner, as shown in FIG. 5B, so as to improve both the heat exchange and the alignment of fin 25 along a generatrix of cylinder 10.

As is apparent from FIG. 4, the side-by-side arrangement of fins 25, the underside 25C of each being in contact with cylinder 10, creates a sort of fan, leaving an air guide in the form of longitudinal channels free through which the cooling air can circulate longitudinally. The heating sleeves have been omitted from FIG. 4 in order not to clutter the drawing. FIG. 4 shows a single fan of cooling fins 25; there may be several such fans disposed one after another in a heating-and-cooling zone.

Cooling fins 25 are very simple to manufacture because they may be stamped out of a strip of material in order to cut them to the required dimensions, to make aperture 25A and slot 25B, and possibly to machine contact surface 25C. Fins 25 are preferably all of the same size, with the number of fins disposed around a given cylinder depending on the outside diameter thereof. The heating sleeves disposed in apertures 25A serve to hold fins 25 in place about cylinder 10; however, other means may equally well be provided for positioning and fixing fins 25 about the cylinder.

Owing to the simplicity of their concept, the cooling method and the device represented by cooling fins 25 may easily be adapted to all extrusion cylinders, so that either existing extruders may be modified in order to improve their performance, or the inventive device may be installed on new machines from the outset.

What is claimed is:

1. A device for air-cooling an extrusion cylinder having at least one heating-and-cooling zone, said device comprising:

an enclosure surrounding the cylinder and having at least one point of entry, air-delivery means connected to said at least one point of entry, to form a stream of air, heat-exchange means disposed on the periphery of the cylinder in said at least one heating-and-cooling zone, the heat-exchange means comprising at least one heating element for heating the cylinder, said at least one heating element having longitudinally spaced ends, means for guiding the stream of air within said enclosure to distribute the stream of air around the cylinder and to cause the stream of air to flow between said at least one heating element and said enclosure substantially longitudinally along said at least one heating-and-cooling zone, from one end of said at least one heating element to the other end of said at least one heating element, and at least one air outlet connected to said enclosure to receive the stream of air, wherein said at least one point of entry is disposed near the bottom of said enclosure substantially midway along said at least one heating-and-cooling zone, wherein said at least one air outlet comprises two air outlets disposed near the bottom of said enclosure substantially at respective ends of said at least one heating-and-cooling zone, and wherein said means for guiding the stream of air divides the stream of air into two parts flowing in opposite directions toward said air outlets.

2. The device of claim 1, wherein said heat-exchange means comprises a plurality of cooling fins of substantially parallelpiped shape radially disposed side by side over the periphery of at least a portion of the cylinder, each of said fins including a contact part in contact with the cylinder, whereby an air-guiding space of substantially triangular shape is created between every two of said fins.

3. The device of claim 2, wherein said at least one heating-and-cooling zone comprises a plurality of groups of said fins, said groups being aligned along the length of the cylinder.

4. The device of claim 2, wherein said at least one heating element comprises at least one heating sleeve, and wherein said fins include means for placing and fixing said at least one heating sleeve.

5. The device of claim 2, wherein said contact part of each said fin increases heat exchange between the cylinder and each said fin.

6. A method of air-cooling an extrusion cylinder having at least one heating-and-cooling zone, at least one heating element for heating the cylinder being disposed within the at least one heating-and-cooling zone, the at least one heating element having longitudinally spaced ends, the method comprising the steps of:

injecting cool air at at least one point of entry within an enclosure surrounding the at least one heating-and-cooling zone, causing the air to be distributed over a periphery of the cylinder and to flow between the at least one heating element and the enclosure substantially longitudinally along the at least one heating-and-cooling zone from one end of the at least one heating element to the other end of the at least one heating element, and exhausting the air at at least one point of exit from the enclosure, said causing step including causing the cooling air to flow substantially longitudinally from a point of entry disposed near the bottom of the enclosure, substantially midway along the at least one heating-and-cooling zone, in opposite directions toward two points of exit disposed near the bottom of the enclosure, substantially at two ends of the at least one heating-and-cooling zone.

7. An extruder comprising at least one device for air-cooling an extrusion cylinder having at least one heating-and-cooling zone, said device comprising:

an enclosure surrounding the cylinder and having at least one point of entry, air-delivery means connected to said at least one point of entry to form a stream of air, heat exchange means disposed on a periphery of the cylinder in said at least one heating-and-cooling zone, the heat-exchange means comprising at least one heating element for heating the cylinder, said at least one heating element having longitudinally spaced ends, means for guiding the stream of air within said enclosure to distribute the stream of air around the cylinder and to cause the stream of air to flow substantially longitudinally along said at least one heating-and-cooling zone between said at least one heating element and said enclosure from one end of said at least one heating element to the other end of said at least one heating element, and at least one air outlet connected to said enclosure to receive the stream of air, wherein said at least one point of entry is disposed near the bottom of said enclosure substantially midway along said at least one heating-and-cooling zone, wherein said at least one air outlet comprises two air outlets disposed near the bottom of said enclosure substantially at respective ends of said at least one heating-and-cooling zone, and wherein said means for guiding the stream of air divides the stream of air into two parts flowing in opposite directions toward said air outlets.

8. A device for cooling a cylinder, the cylinder having a longitudinal direction, the device comprising:

an enclosure surrounding the cylinder and having at least one point of entry and at least one point of exit;

an air-feeding device connected to the at least one point of entry to form a stream of air within the enclosure;

an air guide for guiding the stream of air in the longitudinal direction along the cylinder; and a heat exchanger disposed around the cylinder, the heat exchanger comprising:

a plurality of heating elements operatively connected to the cylinder to heat the cylinder; and a plurality of cooling elements formed independently of the cylinder and operatively connected to the cylinder to cool the cylinder, at least one of the cooling elements being disposed between two of the heating elements, the cooling elements extending in the longitudinal direction along the cylinder to direct the stream of air in the longitudinal direction along the cylinder toward the at least one point of exit;

the cylinder including a cylinder portion having two longitudinally spaced ends, wherein the at least one point of entry is disposed at a central part of the cylinder portion, between the longitudinally spaced ends, wherein the at least one point of exit comprises a first point of exit at one of the ends and a second point of exit at the second of the ends, and wherein the cooling elements direct the stream of air along the cylinder portion from the at least one point of entry toward the first point of exit and from the at least one point of entry toward the second point of exit.

9. The device of claim 8, wherein the cooling elements comprise cooling fins.

10. The device of claim 8, wherein the cooling elements form channels extending in the longitudinal direction along the cylinder to direct the stream of air in the longitudinal direction.

11. The device of claim 8, wherein the heating elements comprise heating sleeves held in place about the cylinder by the cooling elements.

12. The device of claim 8, wherein the cooling elements each includes at least one aperture, and wherein the apertures receive at least one of the heating elements to hold the at least one of the heating elements in place about the cylinder.

13. The device of claim 8, wherein the cylinder comprises an extrusion cylinder.

* * * * *